Dec. 6, 1955     R. E. JONES, SR     2,725,787
ENDLESS FILM PROJECTOR

Filed Dec. 26, 1950     2 Sheets-Sheet 1

Roy E. Jones, Sr.
INVENTOR.

Dec. 6, 1955

R. E. JONES, SR 2,725,787

ENDLESS FILM PROJECTOR

Filed Dec. 26, 1950

Roy E. Jones, Sr.
INVENTOR.

BY
Attorneys

United States Patent Office 2,725,787
Patented Dec. 6, 1955

2,725,787

ENDLESS FILM PROJECTOR

Roy E. Jones, Sr., Miami, Fla., assignor to Cab-O-Mat, Inc., Miami, Fla., a corporation of Florida Application December 26, 1950, Serial No. 202,626

2 Claims. (Cl. 88—28)

This invention relates to new and useful improvements and structural refinements in display apparatus, and the principal object of the invention is to provide an apparatus of the character herein described, wherein display indicia are projected on a screen in a continuous repeating fashion, either in the form of a series of pictures, or a series of letters arranged in successive, readable formation to convey a message, or a combination of pictures and letters, as desired.

In particular, the invention concerns itself with the provision of a relatively small, self-contained display unit which may be conveniently installed in conveyances such as taxicabs, or the like, for the purpose of attracting the attention of passengers.

Some of the advantages of the invention reside in its simplicity of construction, in its efficient and dependable operation, in its compact size and pleasing appearance, and in its adaptability to economical manufacture.

With the above more important objects and features in view, and such other objects and features as may become apparent as this specification proceeds, the invention consists essentially of the arrangement and construction of parts as illustrated in the accompanying drawings, in which:

Figure 4 is a diagrammatic view of the optical system of the invention.

Like characters of reference are employed to designate like parts in the specification and throughout the several views.

Figure 1:
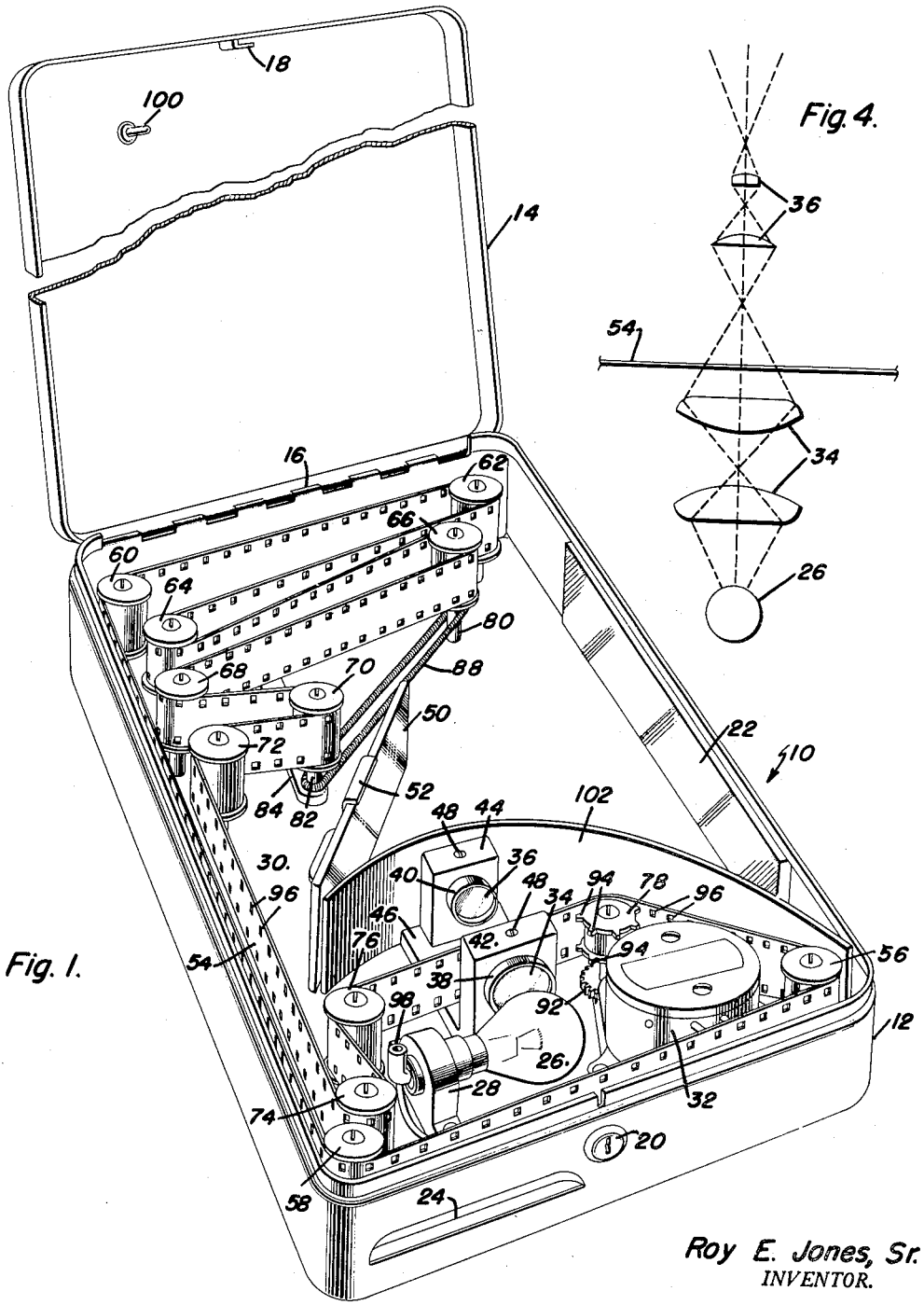
Figure 1 is a perspective view of the invention, the housing of the apparatus being open so as to reveal the mechanism therein.

Referring now to the accompanying drawings in detail, the invention consists of a display apparatus which is designated generally by the reference character 10 and embodies in its construction a box-shaped, relatively flat housing 12 including a hinged cover 14, the hinge of the cover being illustrated at 16 and it being apparent that the cover is provided with a catch 18 for coaction with a lock 20 on the housing 12, whereby the cover may be sustained in a closed position.

An elongated projection screen 22 of translucent material is suitably mounted in one of the side walls of the housing 12, and the housing may also be formed with a struck-in portion to afford a ventilating slot 24 for dissipation of heat from the mechanism within the casing, as will be presently described.

This mechanism embodies a suitable electric lamp 26 mounted in a socket 28 on a base plate 30 secured to the bottom of the housing 12, this socket (28) being electrically connected in parallel to an electric motor 32 which the base plate 30 also carries. By virtue of this electrical connection, the motor and the lamp are energized and deenergized simultaneously.

The lamp 26 is optically aligned with an optical system including a set of condenser lenses 34 and a set of projection lenses 36, the sets of lenses 34, 36 being suitably mounted in conventional cases 38, 40, respectively, which, in turn, are supported in upstanding brackets 42, 44, respectively, on a connecting plate 46 which is secured to the base plate 30. To facilitate focusing, the cases 38, 40 are slidably longitudinally in the brackets 42, 44, respectively, but may be locked in predetermined positions by suitable set screws 48.

The lens 34, 36 are in optical alignment with an elongated, angularly disposed reflector or mirror 50 which is mounted by a suitable bracket 52 on the base plate 30 and is capable of deflecting the light rays which are projected from the lamp 26 through the lens 34, 36 on the screen 22, that is, on the inner surface of the screen. However, since the screen is translucent, the projected light is visible from the exterior of the housing, as will be readily understood.

Figures 2, 3:
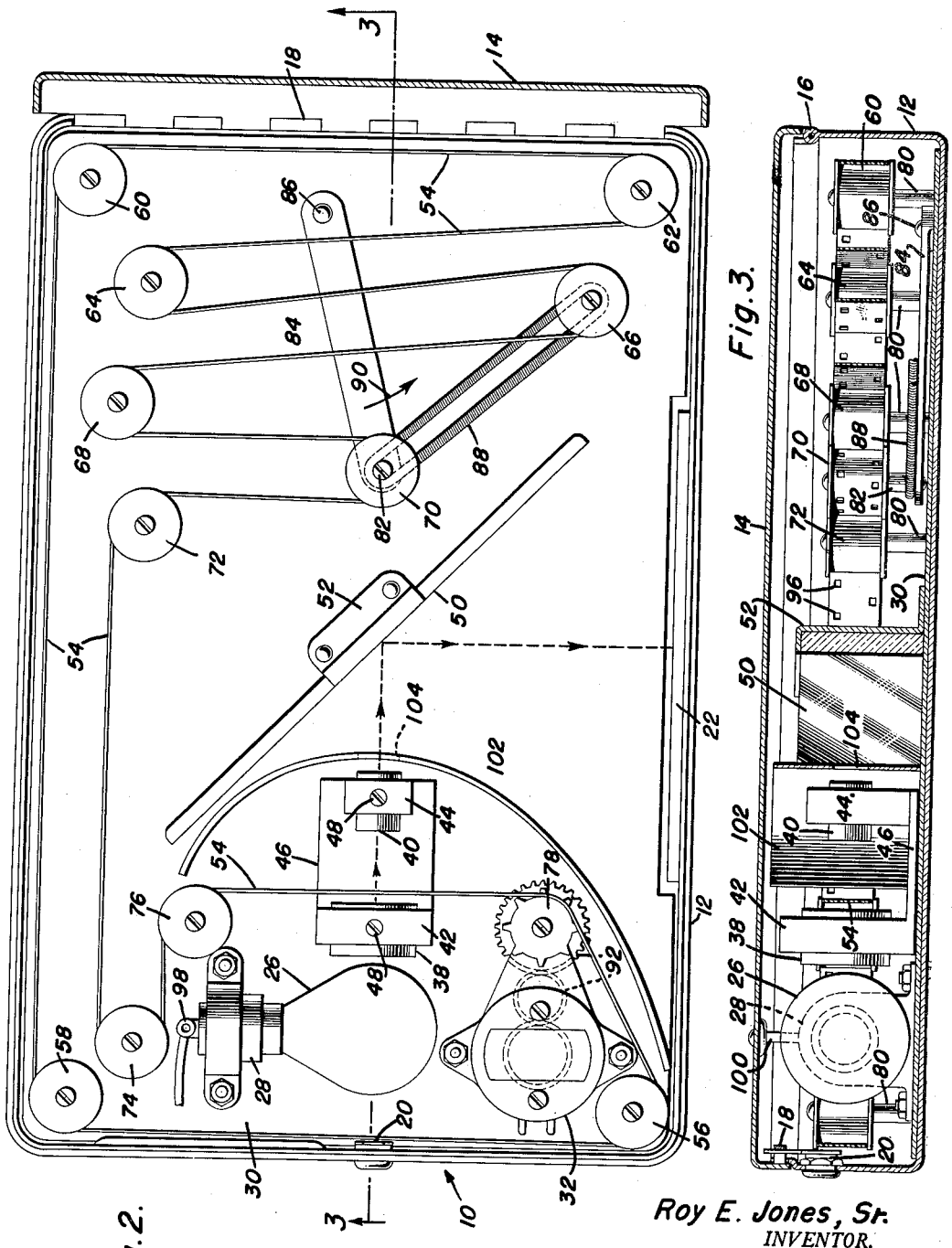
Figure 2 is a top plan view of the subject shown in Figure 1, the cover of the housing being illustrated in cross section.
Figure 3 is a longitudinal section view, taken substantially in the plane of the line 3—3 in Figure 2.

The indicia which are to be projected and displayed are carried by an endless band of film 54 which passes through the optical system between the sets of lens 34, 36 and engages a series of guide rollers 56, 58, 60, 62, 64, 66, 68, 70, 72, 74, 76 and 78. These rollers are rotatably mounted on suitable shafts or pins 80 supported by the base plate 30, and as is best shown in Figures 1 and 2, the several rollers are so arranged that the film travels a tortuous path and, therefore, a film band of considerable length may be employed.

While it has been said that the pins 80 of the several rollers are mounted on the base plate 30, this is true with the exception of the pin 82 of the roller 70 which is carried by an arm 84, pivotally attached to the base plate 30 as at 86.

An endless elastic band 88 extends between the pin 82 and the pin 80 of the roller 66, thereby urging the arm 84 in the direction of the arrow 90 (see Figure 2) and sustaining the band of film 54 under tension to prevent slack.

The film 54 is driven by means of the aforementioned motor 32 which is operatively connected by suitable gearing 92 to the roller 78, the latter assuming the form of a cog wheel having sets of teeth 94 for driving reception in the usual apertures 96 with which the longitudinal edges of the film 54 are commonly provided.

When the invention is placed in operation, the lamp 26 is energized and the motor 32 is energized simultaneously therewith, thus causing the endless band of film 54 to travel around the various rollers and to pass through the optical system between the sets of lenses 34, 36. Light rays emanating from the lamp 26 through the lenses 34 will project images of the indicia on the film through the lenses 36 and by means of the reflector 50 on the screen 22 for display purposes. In the preferred form of the invention, the film 54 is provided with indicia assuming the form of a series of letters arranged in readable formation for successive projection on the screen so as to form a continuously moving message which may be read by an observer as it progressively appears on the right-hand side of the screen and travels longitudinally to disappear at the left-hand side. However, other forms of indicia may, of course, be employed.

If desired, the socket 28 of the lamp 26 may be provided with a switch 98 including an actuating plunger 100 which is secured to the cover 14 of the housing, the switch 98 being closed when the plunger 100 is inserted therein, but being opened when the plunger is withdrawn upon opening of the cover 14, so as to assure that the lamp 26 and the motor 32 are deenergized when the cover 14 is opened for purposes of inspection or replacement of the film 54.

It is to be noted that the entire mechanism within the housing 12 is mounted on and carried by the base plate 30 which is removably positioned in the housing and, together with the mechanism thereon, may be readily removed when the cover 14 is opened.

It is believed that the advantages and use of the invention will be clearly apparent from the foregoing disclosure and accordingly, further description thereof at this point is deemed unnecessary.

While in the foregoing there has been shown and described the preferred embodiment of this invention it is to be understood that minor changes in the details of construction, combination and arrangement of parts may be resorted to without departing from the spirit and scope of the invention as claimed.

Having described the invention, what is claimed as new is:

1. A display apparatus comprising an elongated flat housing having side and end walls, one of said side walls having a viewing opening therein, a reflector panel mounted within said housing at an angle to said viewing opening, a source of light within said housing mounted adjacent one end thereof, a condenser lens, and a projection lens spaced from one another in alignment with said source of light and said reflector panel to reflect light through said opening, a plurality of reels within said housing and including a driving reel adapted to drive an endless band of film around said reels and between the lenses to project the images on the film through the viewing opening, and a shield within the housing between the reflector panel and the projection lens, said shield having an aperture therethrough in alignment with said projection lens to permit the passage of light to said reflector panel, one of said reels being swingably mounted within said housing and resiliently urged in one direction to tension a band of film entrained over the reels, electrical means for actuating said driving reel, a hinged cover on said housing, a fixed contact on said housing and a movable contact on said cover for said electrical means to render the drive reel inoperative upon raising the cover.

2. A display apparatus comprising an elongated flat housing having side and end walls, one of said side walls having a viewing opening therein, a reflector panel mounted within said housing at an angle to said viewing opening, a source of light within said housing mounted adjacent one end thereof, a condenser lens, and a projection lens spaced from one another in alignment with said source of light and said reflector panel to reflect light through said opening, a plurality of reels within said housing and including a driving reel adapted to drive an endless band of film around said reels and between the lenses to project the images on the film through the viewing opening, and a shield within the housing between the reflector panel and the projection lens, said shield having an aperture therethrough in alignment with said projection lens to permit the passage of light to said reflector panel, means connected to one of said reels to tension a band of film entrained over the reels, electrical means for actuating said driving reel, a removable cover on said housing, a fixed contact on said housing and a movable contact on said cover for said electrical means to render the drive spool inoperative upon raising the cover.

References Cited in the file of this patent

UNITED STATES PATENTS

| | | |
|---|---|---|
| 1,290,947 | Erskine | Jan. 14, 1919 |
| 1,756,980 | Joy | May 6, 1930 |
| 1,792,971 | Fawell | Feb. 17, 1931 |
| 1,816,899 | Godel | Aug. 4, 1931 |
| 1,886,144 | Zeledon | Nov. 1, 1932 |
| 1,943,533 | Hubschmann | Jan. 16, 1934 |
| 1,987,710 | Robbins | Jan. 15, 1935 |
| 2,015,937 | Holsman | Oct. 1, 1935 |
| 2,025,361 | Silling | Dec. 24, 1935 |
| 2,033,478 | Martinez | Mar. 10, 1936 |
| 2,516,979 | Gould et al. | Aug. 1, 1950 |